United States Patent [19]

Slazas

[11] 4,291,778
[45] Sep. 29, 1981

[54] FOOT PEDAL ARRANGEMENT FOR A MOTOR VEHICLE

[75] Inventor: John J. Slazas, Cedarburg, Wis.

[73] Assignee: Allis-Chalmers Corporation, Milwaukee, Wis.

[21] Appl. No.: 123,737

[22] Filed: Feb. 22, 1980

Related U.S. Application Data

[63] Continuation of Ser. No. 957,715, Nov. 6, 1978, abandoned, which is a continuation of Ser. No. 754,342, Dec. 27, 1976, abandoned.

[51] Int. Cl.$^3$ .......................... G05G 1/16; G05G 5/06
[52] U.S. Cl. ...................................... 180/271; 74/529; 74/560
[58] Field of Search ............... 74/512, 513, 514, 560, 74/482, 564, 529, 594.6; 188/265; 180/271, 900, 90.6

[56] References Cited

U.S. PATENT DOCUMENTS

| 352,512 | 11/1886 | Bodecker | 74/81 |
|---|---|---|---|
| 493,696 | 3/1893 | Ferguson | 74/594.6 |
| 1,654,321 | 12/1927 | Collins | 74/512 |
| 2,521,624 | 9/1950 | Arnett | 74/513 |
| 2,532,861 | 12/1950 | Siever | 74/513 |
| 2,824,464 | 2/1958 | Remington | 74/513 |
| 4,043,217 | 8/1977 | Kleist | 74/512 |

*Primary Examiner*—Kenneth Dorner

[57] ABSTRACT

The foot pedal assembly of a motor vehicle brake control includes a foot pedal which is mounted on a laterally extending arm of lever for limited pivotal movement about a transverse axis. The foot pedal includes a latching part which cooperatively engages a complementary part on the tractor to hold the foot pedal assembly in a parking brake position. The main part of the foot pedal is cut from a piece of extruded metal, such as aluminum. A vertically disposed end plate is releasably secured to the main part and extends upwardly to serve as an abutment or shoulder to prevent the operator's foot from sliding off the pedal. The end plate extends into a recess in the arm to maintain the pedal on the arm.

6 Claims, 6 Drawing Figures

FOOT PEDAL ARRANGEMENT FOR A MOTOR VEHICLE

This is a continuation, of application Ser. No. 957,715, filed Nov. 6, 1978, abandoned which was a continuation of application Ser. No 754,342, filed Dec. 27, 1976 abandoned.

BACKGROUND OF THE INVENTION

It is well known in the vehicular art to provide releasable parking brakes for automobiles and the like. Foot operated brake pedals with latching devices to hold the brake pedals in their brake engaged position are shown in U.S. Pat. Nos. 1,840,960; 2,115,776; 2,232,790; and 3,229,792.

BRIEF DESCRIPTION OF THE INVENTION

A riding tractor, such as used for lawn and garden work, is provided with a foot operated brake mechanism including a brake pedal pivotally connected to a horizontal arm extending from the upper end of a pivoted lever. The pivotable foot pedal includes a latch which cooperatively engages a complementary latch part on the running board or floor board of the tractor. The foot pedal includes a main part for engagement by the operator's foot and a vertical plate secured to one lateral end of the foot part which has a portion extending upwardly to serve as an abutment to prevent the operator's foot from sliding off the pedal in one lateral direction. The plate also includes a part which cooperates with a recess in the arm of the brake lever to prevent axial movement of the brake pedal relative to the arm.

It is an object of the present invention to provide an improved latching means to releasably hold a foot operated brake pedal assembly in a brake applied position.

It is a further object of the present invention to provide a braking mechanism for a tractor as outlined in a previous object wherein the latching means cooperates with a forwardly extending lip on the floor of the tractor.

It is a further object of the present invention to provide a foot operated control including a pivot lever and a pedal having a vertical plate serving to prevent the operator's foot from sliding off the pedal and extending into a recess in an arm of the lever so as to prevent endwise movement of the pedal in its installed condition.

It is a further object of the present invention to provide a latching mechanism for a foot operated pedal which has substantial contact area to provide firm engagement and long trouble-free service.

This and other objects and advantages of the present invention will be apparent to those familiar with the art to which the invention pertains upon reference to the description of the drawings which follows.

BRIEF DESCRIPTION OF THE DRAWINGS

One embodiment of the invention is illustrated in the drawings in which.

DETAILED DESCRIPTION OF THE DRAWINGS

Figure 1:
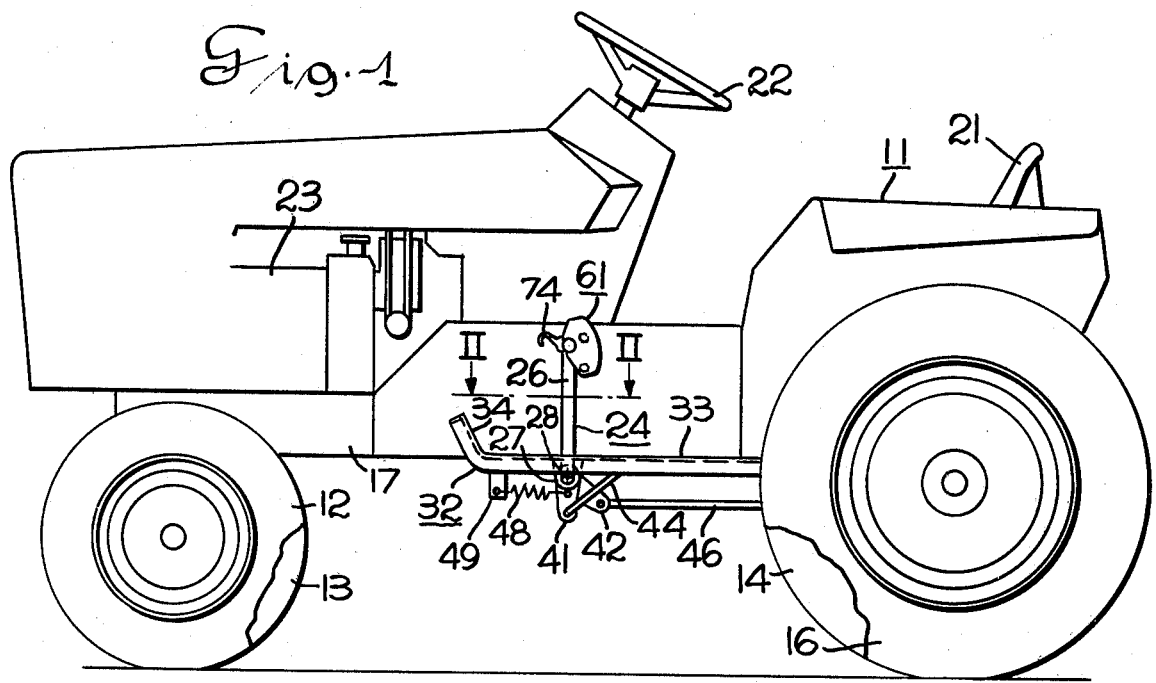
FIG. 1 is a side view of a tractor having a brake and clutch operating mechanism in which the present invention is incorporated.
Figure 2:
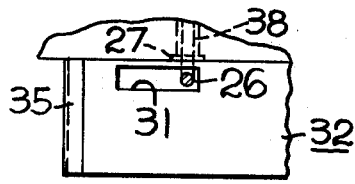
FIG. 2 is a view taken along the line II—II in FIG. 1.

Referring to FIG. 1, a lawn and garden tractor 11 includes a pair of front steerable wheels 12, 13 and a pair of rear drive wheels 14, 16 which support the main frame 17 of the tractor in a conventional manner, an operator station in the form of a bucket seat 21 is provided on the rear of the tractor together with a manually operated steering wheel 22. An engine 23 mounted on the front of the frame 17 is connected to the drive wheels 14, 16 through a power transmitting mechanism (not shown). A foot operated control 24 is provided for controlling the transmission of power to the rear wheels and for applying the vehicle brakes. A bracket 27 on the main frame 17 pivotally mounts a lever 26 of the control 24 for limited pivotal movement about a transverse axis 28. The lever 26 includes a generally upright or upstanding portion which extends through a slot 31 in a foot rest or running board in the form of a floor board 32 secured to one lateral side of the main frame 17. The floor board 32 includes a horizontal portion 33 and an upwardly inclined portion 34 at its forward end which terminates in a forwardly and downwardly inclined and transversely extending wall or lip 35 having a horizontal edge 36. The lever 26 includes a transversely extending portion 38 which extends beneath the main frame 17. A pair of downwardly extending legs 41, 42 are secured as by welding to the transversely extending portion 38 of the lever 26. A clutch control rod 44 and a brake control rod 46 are connected, respectively, to the free ends of the legs 41, 42. The pedal 26 is biased to its upright brake released and clutch engaged position, as shown in FIG. 1, by a tension spring 48 secured at its front end to a bracket 49 on the main frame 17 and its rear end to the leg 41.

Figure 3:
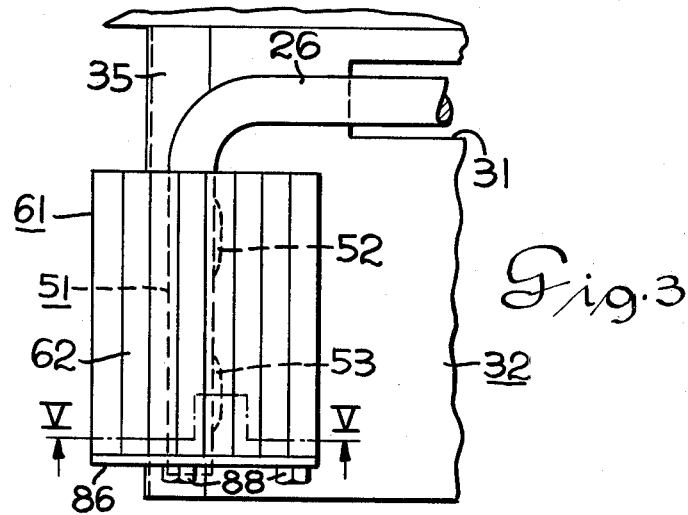
FIG. 3 is a top view of the foot pedal in its latched parking position.
Figure 6:
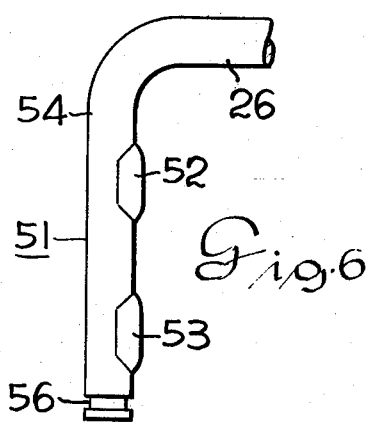
FIG. 6 is a top view of the brake lever with the foot pedal removed.

As shown in FIGS. 3 and 6, the lever 26 includes a horizontal portion or arm 51 which extends laterally outwardly from the upper end thereof and is generally cylindrical except for pinched flanges 52, 53 which extend radially outwardly beyond the cylinder defined by the cylindrical surface 54 of the arm 51. The free end of the arm 51 includes an annular recess 56 formed therein, the function of which will be hereinafter explained.

Figure 5:
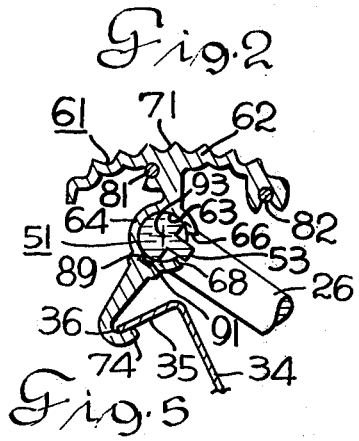
FIG. 5 is a section view taken along the line V—V in FIG. 3.
Figure 4:
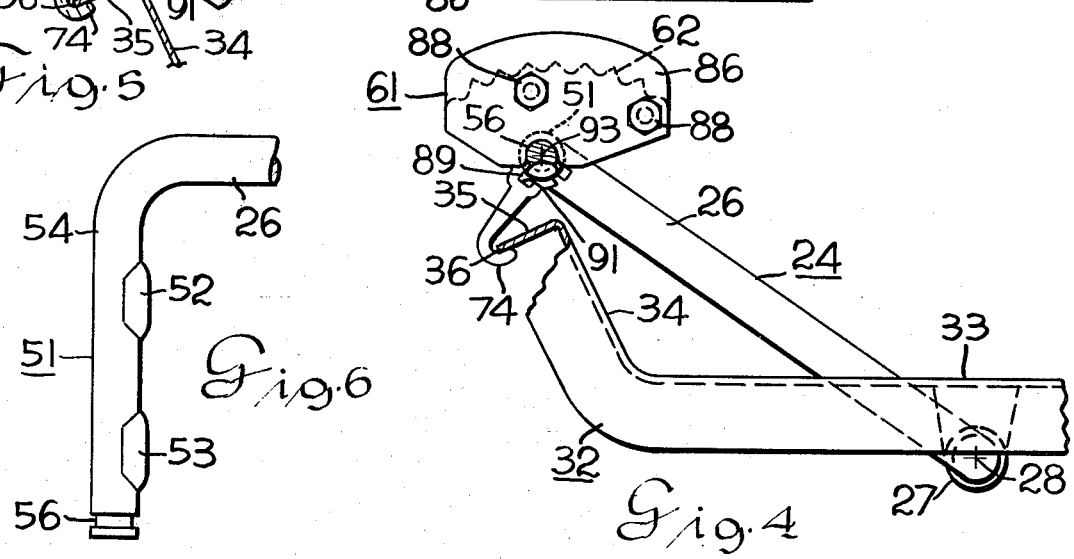
FIG. 4 is a side view of the pedal shown in FIG. 3.

Referring also to FIGS. 3, 4 and 5, a foot pedal assembly 61 includes a foot engaging part 62 made of extruded material such as aluminum. A generally cylindrical opening 63 in foot part 62 is defined by an annular wall 64 which terminates in circumferentially confronting surfaces 66, 68 defining spaced abutments in confronting relation to the aligned flanges 52, 53 on the arm 51. The part 62 includes a corrugated foot engaging surface 71 on its top side and a downwardly extending hook or latch portion 74 at its bottom side which is adapted for engagement with the transversely extending lip 35 of the floor portion 34. A pair of cylindrical grooves 81, 82 are provided on the underside of the part 62 which are adapted to be threaded by appropriate means. The part 62 is held against translatory movement relative to the arm 51 of the lever 26 by a vertically disposed plate 86 extending downwardly into the recess 56 on the arm 51. The upper end of the plate 86 extends above the part 62 so as to serve as an abutment or shoulder for the operator's foot thereby preventing the operator's foot from slipping laterally outward off the foot engaging part 62. The plate 86 is securely fastened to the part 62 by a pair of self-tapping cap screws 88 threaded into the cylindrical grooves 81, 82 of the part 62. A resilient rubber like strip 89 is placed in an axially extending, extruded groove 91 which interrupts the inwardly facing cylindrical surface 63 of the part 62. As illustrated in FIG. 5, the installed strip 89 is compressed in the groove 91 so as to be in radial thrust transmitting relation to the arm 51 of lever 26 whereby the pedal assembly 61 is frictionally held in whatever position it may be rotated by the operator's foot. The rubber strip 89 also serves to prevent the pedal from rattling on the arm 51. As shown in FIG. 5, the pedal part 62 may be rotated about the transverse axis 93 of the arm 51 between the predetermined limits established by engagement of abutment surfaces 66 and 68 with the confronting sides of the flanges 52, 53. It will be noted that the axis 93 is parallel to the axis 28.

As shown in FIG. 1, the combined brake and clutch control 24 is shown in a brake released and clutch applied position to which it is biased by the tension spring 48. When the operator wishes to disengage the clutch, he will place his foot upon the foot pedal part 62 and pivot it forwardly and downwardly through a predetermined arc at which point the power train will be interrupted by movement of rod 44. Further depression or pivoting of the lever 26 will engage the brakes through link 46. If the operator wishes to lock the brakes in an engaged position such as when he leaves the tractor, he can lock the brake lever 26 in its forwardly and downwardly rotated position such as shown in FIGS. 3, 4 and 5 by rotating the foot pedal assembly 61 in a counterclockwise direction as viewed in FIGS. 1, 4 and 5 so as to permit the hook or latching portion 74 to engage the lip 35 on the floor board. Thus the brake and clutch pedal control 24 can also be utilized as a parking brake for the lawn and garden tractor 11. When the operator desires to unlatch the brake pedal, he depresses the pedal with his foot and then rotates the foot pedal clockwise as viewed in FIG. 4 to unlatch the hook part 74 from the lip 35. The operator may then gradually remove his foot from the pedal to disengage the brake and establish drive to the rear wheels of the tractor.

The extruded pedal part 62 is conveniently held against axial movement relative to the arm 51 by the cooperative engagement of the abutment plate 86 with the recess 56 which is at right angles to the axis 93. Thus the plate 86 serves a dual function of a locking plate for the pedal assembly and an abutment for the operator's foot preventing accidental slipping of the operator's foot laterally outward off the pedal part 62. The rubber like strip 89 serves as a friction means to hold the pedal assembly 61 in whatever position the operator may have moved it and also serves to prevent any rattling of the lever 26 and the pedal part 62 that might otherwise occur due to normal tolerances allowed for parts made from rod stock and extruded materials. The latching portion 74 extends the full axial width of the pedal part 62, thus providing a large lateral width or area of thrust transmitting engagement with the edge 36 of the lip 35 of the floor board 32 in the parking brake position illustrated in FIG. 5. The foot pedal assembly 61, which is made of relatively inexpensive components, is relatively easy to assemble and disassemble and is believed to provide long, trouble-free service.

The embodiments of the invention in which an exclusive property or privilege is claimed are defined as follows:

1. In a tractor having a main frame and an operator's station, the combination comprising:
   a floor secured to and disposed at one lateral side of said main frame, said floor having a horizontal portion and an upwardly inclined portion at the forward end of said horizontal portion, said inclined portion terminating at its front end in a downwardly and forwardly inclined lip, the edge of which extends in a transverse direction,
   a brake lever pivotally mounted on said tractor for swinging movement about a first transverse axis between a raised brake released position and a lowered brake applied position including an upstanding portion and an arm extending transversely from the upper end of said upstanding portion,
   means resiliently biasing said lever toward its brake released position,
   a foot pedal mounted on said arm for limited pivotal movement about a second transverse axis including a hook on said pedal substantially as wide as the axial width of said foot pedal adapted to engage said lip when said lever is pivoted to its brake applied position and said pedal is pivoted in one direction about said second axis, whereby a parking brake function is achieved, said lip on said floor being of greater transverse dimension than the width of said hook, said foot pedal including wall means defining a cylindrical opening through which said arm extends and an axial groove in said cylindrical opening, and
   a resilient member in said groove in resilient engagement with said arm releasably holding said foot pedal in selected positions of pivotal adjustment on said arm.

2. The combination of claim 1 wherein said foot pedal is extruded material.

3. In a foot operated control, the combination comprising:
   a support,
   a lever pivotally mounted on said support for limited swinging movement about an axis including
      an upstanding portion,
      an arm extending from the upper end of said upstanding portion in one direction parallel to said axis and
      a recess in said arm at its free end extending at right angles to said one direction, and
   a foot pedal assembly including,
      a horizontally extending foot engaging part having an opening through which said arm extends,
      a vertically disposed plate at the one end of said part adjacent the free end of said arm having a portion extending into said recess in said arm whereby said foot pedal assembly is locked against translatory movement relative to said arm and an upstanding portion extending beyond the upper surface of said foot engaging part to serve as an abutment preventing the operator's foot from slipping sideways from said part in said one direction, and
      releasable securing means rigidly fastening said plate to said one end of said foot engaging part for movement therewith, said foot engaging part being free to move axially in said one direction from said arm when said plate is removed from said foot engaging part.

4. The combination of claim 3 wherein said foot engaging part is extruded material.

5. The combination of claim 4 wherein said opening includes an extruded groove extending axially the full axial width of said foot engaging part and further comprising a resilient strip compressed in said groove and in radial thrust transmitting relation with said arm.

6. The combination of claim 3 wherein said support includes a horizontal lip extending parallel to said axis a distance greater than the width of said foot engaging part of said pedal assembly and wherein said foot engaging part is mounted on said arm for limited pivotal movement about a second axis parallel to said first mentioned axis and having a hook portion of substantially coextensive width adapted to engage said lip when said pedal is depressed and said foot engaging part is pivoted in one direction.

* * * * *